US006676915B2

(12) United States Patent
Fiquet et al.

(10) Patent No.: US 6,676,915 B2
(45) Date of Patent: Jan. 13, 2004

(54) METHOD FOR CONDITIONING SODA EFFLUENTS IN THE FORM OF NEPHELINE

(75) Inventors: Olivier Fiquet, Venelles (FR); Ronan Le Chenadec, Languidic (FR); Didier Gibert, Beaumont de Pertuis (FR)

(73) Assignee: Commissariat a l' Energie Atomique (FR)

( * ) Notice: Subject to any disclaimer, the term of this patent is extended or adjusted under 35 U.S.C. 154(b) by 38 days.

(21) Appl. No.: 10/149,958

(22) PCT Filed: Jan. 25, 2001

(86) PCT No.: PCT/FR01/00233

§ 371 (c)(1),
(2), (4) Date: Jun. 17, 2002

(87) PCT Pub. No.: WO01/56040

PCT Pub. Date: Aug. 2, 2001

(65) Prior Publication Data

US 2002/0198431 A1 Dec. 26, 2002

(30) Foreign Application Priority Data

Jan. 26, 2000 (FR) .......................................... 00 00985

(51) Int. Cl.[7] ............................................ C01B 33/26
(52) U.S. Cl. ....................... 423/328.2; 588/10; 588/14; 588/15
(58) Field of Search ......................... 423/328.2; 588/10, 588/14, 15

(56) References Cited

U.S. PATENT DOCUMENTS

| | | | |
|---|---|---|---|
| 4,028,265 A | | 6/1977 | Barney et al. |
| 4,055,622 A | | 10/1977 | Christophliemk et al. |
| 4,271,130 A | | 6/1981 | Endres et al. |
| 4,859,367 A | | 8/1989 | Davidovits |
| 5,591,323 A | * | 1/1997 | Marcilly et al. |

FOREIGN PATENT DOCUMENTS

| | | | |
|---|---|---|---|
| EP | 0392400 | 10/1990 | ........... C01B/33/34 |
| FR | 2319577 | 2/1977 | ........... C01B/33/28 |
| FR | 2543939 | 10/1984 | ........... C01B/33/28 |
| GB | 2138792 A | 10/1984 | ........... C01B/33/28 |

OTHER PUBLICATIONS

Synthesis of 4A Zeolite From Clacined Kaolins for use in Detergents; By: Enrique Costa, Antonio de Lucas, M. Angeles Uguina and Juan Carlos Ruiz; 1988 American Chemical Society, Ind. Eng. Chem. Res. 1988, 27, pp. 1291–1296.

* cited by examiner

*Primary Examiner*—David R Sample
(74) *Attorney, Agent, or Firm*—Hayes Soloway P.C.

(57) ABSTRACT

This invention relates to a method for conditioning a waste constituted of an aqueous solution of sodium hydroxide NaOH of 3 to 10 M, possibly radioactive. The method is as follows:

a) a metakaolin powder is added to the aqueous solution such that a suspension is obtained capable of solidifying and forming a crystalline phase of the zeolite A type;
b) the suspension is introduced into a mould;
c) the suspension is left to solidify in the mould in order to obtain a moulded solid product based on zeolite A;
d) the moulded product is dried; and
e) the zeolite A phase is converted into a nepheline type phase by heat treatment at a temperature of 1000° C. to 1500° C.

10 Claims, 1 Drawing Sheet

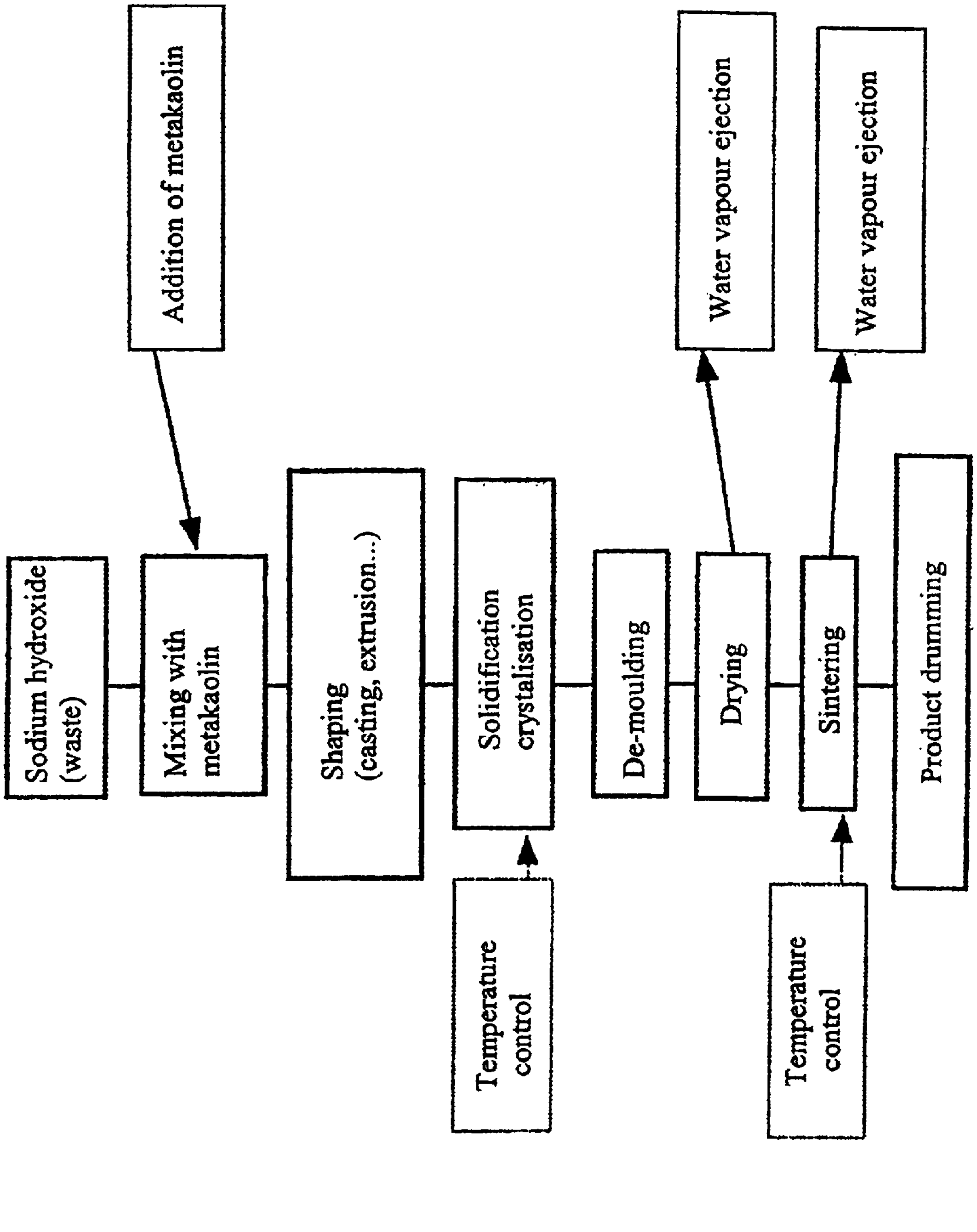
Sodium hydroxide (waste)
Mixing with metakaolin
Addition of metakaolin
Shaping (casting, extrusion...)
Solidification crystalisation
Temperature control
De-moulding
Drying
Water vapour ejection
Sintering
Water vapour ejection
Temperature control
Product drumming

METHOD FOR CONDITIONING SODA EFFLUENTS IN THE FORM OF NEPHELINE

FIELD OF THE INVENTION

The present invention relates to a method for conditioning wastes constituted of aqueous solutions of sodium hydroxide.

More precisely, it concerns the treatment of radioactive solutions of sodium hydroxide, obtained as waste from fast neutron nuclear reactors.

In fact, the development of fast neutron nuclear reactors, using metallic sodium as coolant, results in the production of radioactive sodium wastes. These wastes can come from the operation of industrial and experimental reactors, but also from research laboratories. They can contain radioactive elements, such as $^{22}Na$ and other radioactive elements resulting from electronuclear activity in general such as uranium, plutonium, caesium, cobalt etc.

In order to reduce the potential chemical risk represented by stocking sodium in its metallic form, this waste is generally converted into a concentrated sodium hydroxide solution by a water destruction method.

These concentrated sodium hydroxide solutions must be transformed into solid wastes, retaining the radioactive products they may contain, with a view to storage.

STATE OF PRIOR ART

The document U.S. Pat. No. 4,028,265 [1] describes a method for conversion of caustic liquid radioactive wastes containing sodium nitrate into an insoluble solid product. According to this method, a clay powder with a base of aluminium silicate reacts with an aqueous solution or a suspension of the radioactive liquid waste, which has a concentration of sodium hydroxide of 3 to 7 M and which contains sodium nitrate, to form a product of the cancrinite type, which is then transformed by calcination, at least at 600° C., into a mineral form such as nepheline This conversion corresponds to the reaction diagrams below:

$$Al_2SiO_2.2H_2O+2NaOH+0.52\ NaNO_3+0.68H_2O\rightarrow Na_2O.Al_2O_3.2SiO_2.0.68H_2O.0.52NaNO_3+3H_2O \quad (1)$$

$$Na_2O.Al_2O_3.2SiO_2.0.68H_2O.0.52NaNO_3\ \underline{\Delta}2NaAlSiO_4.\ 0.26Na_2O+0.68H_2O+0.26N_2O_5 \quad (2)$$

The silico-aluminous clays suitable for use for this conversion belong to the group comprising kaolin, bentonite, dickite, halloysite and pyrophillite. Using the intermediary product (cancrinite) of diagram (1), during calcination either a free powder is formed, or objects moulded by compression of the intermediary product in the shape required, followed by sintering at less than 600° C.

In this method, it is thus necessary to manipulate the powders in order to obtain solid shaped products and to use mechanical or hydraulic presses to compress these powders.

Also known are methods for synthesizing zeolite 4A, from calcinated kaolins, by reaction of the latter with sodium hydroxide, as described in Ind. Eng. Chem. Res., 27, 1988, pages 1291–1296 [2], and in U.S. Pat. No. 4,271,130, [3]. In the reference [2] a gel is formed by dissolving calcinated kaolin in the sodium hydroxide solution and then, by heating the gel, a solid product is formed by crystallisation. With this aim, quantities of kaolin are chosen such that the molar ratio $Na_2O/SiO_2$ is between 1.8 and 3.8, and preferably 2.8. The quantity of water is such that the molar ratio $H_2O/Na_2O$ is in the range from 30 to 50, which corresponds to sodium hydroxide solutions of 2.23 to 3.7 M. Zeolite powders are thus obtained, usable in detergent formulae, the dimension of the particles being in the range from 1 to 10 $\mu$m for 99% by weight of the particles.

In reference [3], a zeolite A is obtained from the reaction of metakaolin with an alkaline aqueous medium, using a solution of 7 to 30% sodium hydroxide and a quantity of NaOH, representing 1.3 to 3 times the stoichiometric quantity required for the formation of zeolite A. This corresponds to a ratio $Na_2O/SiO_2$ of 0.05 to 10 and a molar ratio $H_2O/Na_2O$ of 15 to 70, that is a sodium hydroxide solution of 1.58 to 7.4 M. As before, this zeolite in powder form is intended to be used in detergents and this is why a brighter and less yellow zeolite A is sought, a result which is obtained by using metakaolin as the original product.

DESCRIPTION OF THE INVENTION

The aim of the present invention is a method for conditioning waste constituted of an aqueous solution of sodium hydroxide, which makes it possible to obtain solid products, of the nepheline type, without having to treat a powder and compact it.

According to the invention, the method for conditioning a waste, constituted by an aqueous solution comprising 3 to 10 mol/l of sodium hydroxide NaOH, comprises the following stages:

a) a metakaolin powder is added to the aqueous solution such that a suspension is obtained capable of solidifying and forming a crystalline phase of the zeolite A type;

b) the suspension is introduced into a mould;

c) the suspension is left to solidify in the mould in order to obtain a moulded solid product based on zeolite A;

d) the moulded product is dried; and e) the zeolite A phase is converted into a nepheline type phase by heat treatment at a temperature of 10000° C. to 1500° C.

In the method according to the invention, the fact of starting from a concentrated aqueous solution of sodium hydroxide and adding the metakaolin powder in the appropriate quantity makes it possible to obtain a suspension able to solidify to form a zeolite A type crystalline phase.

According to the invention, this zeolite A can thus be obtained directly under the form of a moulded solid product, then transformed into a nepheline type phase by a heat treatment. This is very advantageous when the aqueous solutions of sodium hydroxide contain radioactive products, because the handling of powder, which could result in dispersion of radioactivity, is avoided. Investment in equipment is reduced since it is no longer necessary to use mechanical or hydraulic presses, and one can also reduce the size of the installation and make products moulded according to the dimensions of the waste containers. Furthermore, the use of a nepheline type phase enables the radioactivity to be confined in a stable phase, thus preventing lixiviation of the radioactive products trapped in this structure.

In the method according to the invention, the fact of starting from an aqueous solution of sodium hydroxide, comprising practically no sodium nitrate or nitrite, makes it possible to obtain a zeolite A type crystalline phase by reaction with metakaolin.

In document [1], this phase could not appear, because of the presence of sodium nitrate and nitrite, which would lead to the formation of a cancrinite type phase.

In the invention, the reaction of the metakaolin with the sodium hydroxide corresponds to the following global reaction diagram:

$$96NaOH + 48(Al_2Si_2O_7) + 168H_2O \xrightarrow{20\text{–}70^\circ\,C.} Na_{96}Al_{96}Si_{96}O_{384}\cdot 216H_2O \quad (3)$$

The possibility of obtaining solidification of the sodium hydroxide solution by this reaction results from the choice of metakaolin, the concentration of sodium hydroxide in the original aqueous solution and the quantity of metakaolin added.

In fact, the zeolite phase only appears when metakaolin is used. According to the reaction time, the quantity of metakaolin and the reaction temperature, a proportion of hydroxysodalite phase can be formed. However, this second phase, even in large proportions, does not hinder the solidification of the suspension and the conversion into nepheline.

In order to obtain solidification of the solution directly without exudation, it is important to have a concentration of sodium hydroxide solution higher than 3 mol/l, and preferably higher than 5 mol/l. When the concentration of sodium hydroxide is too low, the reaction takes place leaving behind a floating liquid and a dense solid. When the concentration of sodium hydroxide exceeds 10 mol/l, mixing problems are observed together with a very short solidification time, so that the suspension is then very viscous and the solidification can be too rapid to implement the method according to the invention. It is therefore important to choose a sodium hydroxide solution of 3 to 10 M to obtain this solidification.

Furthermore, the quantity of metakaolin added should be chosen such that it corresponds closely to the stoichiometry of the reaction (3) described above, that is a metakaolin to sodium hydroxide molar ratio that is near the stoichiometry of the reaction, that is to say a molar ratio from 0.4 to 0.6, and preferably of around 0.5.

In order to obtain solidification of the suspension, it is also necessary to keep the water content of the suspension obtained to a suitable value, by adding metakaolin to the sodium hydroxide solution. The water content of this suspension depends on the concentration of sodium hydroxide of the original aqueous solution, since there is no addition of water after adding metakaolin to this solution. Beginning with aqueous solutions containing 3 to 10 mol/l of sodium hydroxide, suspensions are obtained containing 30 to 70% by weight of water, in the case where the quantity of metakaolin added corresponds closely to the stoichiometry of the reaction.

Advantageously the quantity of metakaolin added can be adjusted so that the water content of the suspension represents from 30 to 70% by weight.

Other parameters important for obtaining solidification of the solution are:

- the preparation method of the metakaolin used;
- the granulometry of the metakaolin;
- the treatment temperature; and
- the chemical species, other than NaOH, present in the original aqueous solution.

As far as the metakaolin is concerned, this is obtained by calcination of kaolin at temperatures between 500 and 1200° C. The lower the calcination temperature the greater the reactivity of the product. Nonetheless, the drop in reactivity can be compensated by grinding. Preferably, in the invention, metakaolins obtained at a temperature from 800 to 1000° C. are used, with an average granulometry of 1 to 50 $\mu$m, and more preferably from 1 to 10 $\mu$m.

The treatment temperature used for reaction (3) can be from 15 to 100° C., at atmospheric pressure. It is also possible to operate at higher temperatures under pressure. In fact, moderate heating of the suspension enables activation of the solidification of the suspension.

The chemical species present in the original aqueous solution can interfere with the formation reaction (3) for zeolite A. This is the case in particular for $NO_3^-$ and $NO_2^-$ ions present in the aqueous solution of origin in document reference [1], and which prevent formation of the zeolite A phase and solidification by leading to the cancrinite phase.

Preferably, according to the invention, the total content of $NO_3^-$ and $NO_2^-$ ions in the original aqueous solution is from 0 to 0.5 mol/l.

When the method according to the invention is used for conditioning aqueous solutions of radioactive sodium hydroxide, the presence of these radioactive elements is not a hindrance because they are in very low quantities in the solution.

The possibility of solidifying an aqueous solution of concentrated sodium hydroxide by addition of metakaolin does not concern references [1] to [3] which do not give information about the choice of the metakaolin and the solution of origin, nor about the parameters indispensable for obtaining this solidification.

After solidification of the solution in the form of hydrated zeolite A, the moulded product obtained by this solidification is dried and then submitted to a heat treatment to transform it into nepheline.

The drying can be carried out after de-moulding the product at temperatures from 110 to 500° C.

Heat treatment is then applied to the dried product at temperatures from 1000 to 1500° C., to obtain the transformation into nepheline (between 500 and 850° C.), and then the products are densified by suppressing apparent porosity.

Other features and advantages of the invention will become clearer by reading the description of the following, given as illustrative and non-limiting examples, with reference to the attached diagram.

BRIEF DESCRIPTION OF THE DIAGRAM

The FIGURE is a diagram showing the different stages of the method according to the invention.

DETAILED DESCRIPTION OF EMBODIMENTS

In FIG. 1, it can be seen that the first stage of the method consists of adding the required quantity of metakaolin powder to the original solution of sodium hydroxide (waste), and mixing them together to obtain a homogeneous paste.

Preferably, the average granulometry of the metakaolin powder is less than 10 $\mu$m and this metakaolin has been obtained by calcination of a kaolin in powder form for 1 hour at a temperature of 800° C.

After obtaining a homogeneous mixture, the next stage is shaping by moulding or extrusion. For example, the paste can be poured into a sealed mould to obtain a product in the required shape.

The crystallisation and solidification of the mixture takes place in the following minutes or hours. The time it takes to set depends on the temperature used. In order to activate setting very strongly, one can operate at a temperature from 40 to 70° C. by moderate heating.

It is also possible to encourage the growth of zeolite grains by seeding the suspension with zeolite A crystals to obtain homogeneous crystal nucleation, or with nepheline crystals leading to heterogeneous crystal nucleation.

After solidification, hardened products are obtained which have sufficient mechanical resistance to be handled by automated means. They can thus be de-moulded before being submitted to drying and the final heat treatment.

They can also be kept in the mould, if this is constituted of a material that can be incinerated totally without producing ashes, for example a polymer or cellulose material.

Next comes the drying of the moulded products, carried out slowly to evacuate residual water, avoiding cracking the products. The length of the drying stage evidently depends on the quantity of water to be evaporated, together with the geometry of the moulded products. The operational temperature can be from 110 to 550° C., not exceeding the temperature of 100° C. at first, to avoid any cracking of the moulded products through too brutal ejection of the water vapour. This drying stage corresponds to the following reaction equation:

$$Na_{96}Al_{96}Si_{96}O_{384}.216H_2O \rightarrow Na_{96}Al_{96}Si_{96}O_{384}+216H_2O \quad (4)$$

The dried products are next submitted to the final heat treatment, at least at 1000° C. The aim of this treatment is:

1°) to convert the zeolite phase into a nepheline type phase, a conversion which usually takes place between 500 and 850° C.; and 2°) to densify the moulded products and suppress apparent porosity, which can take place at temperature ranging from 850 to 1500° C.

Thus a densified nepheline phase is obtained, in which the radioactive salts or elements possibly present in the original aqueous sodium hydroxide solution are trapped. The products obtained can then be sent to a storage site, possibly after drumming.

The following examples for conditioning sodium hydroxide solutions are illustrative and non-limiting.

EXAMPLE 1

Conditioning a Solution of 10N Sodium Hydroxide.

At 20° C., 555 gm of metakaolin (PROLABO washed Kaolin product) are added to 500 ml of the 10N sodium hydroxide solution, stirred mechanically. Homogenisation by stirring is continued for 15 minutes, after all the metakaolin has been introduced, and then the suspension is poured into Teflon® moulds. Next the moulds filled with the suspension are introduced into an oven to accelerate setting, working at a temperature of 40° C. After 24 hours, the products are de-moulded, then dried and submitted progressively to a maximum temperature of 110° C. at slow speed over 24 hours, and then they undergo sintering at 1250° C., staying at this temperature for 2 hours, with a heating rate of 2° C./min.

Thus, monolithic products are produced with satisfactory qualities for waste storage.

EXAMPLE 2

Conditioning a Solution of 5N Sodium Hydroxide.

At 20° C., 277.5 gm of metakaolin, identical to that of Example 1 are added to 500 ml of the 5N sodium hydroxide solution, stirred mechanically, and then homogenised for 15 minutes, after all the metakaolin has been introduced. Next, the suspension is poured into Teflon® moulds, and the moulds are heated to 70° C. to accelerate setting of the suspension. After 24 hours, the products are de-moulded, then dried and submitted progressively to a maximum temperature of 110° C. at slow speed over 24 hours. They then undergo sintering at 1250° C. during a time bracket of 2 hours, and with a heating rate identical to that of Example 1.

Thus, products are produced with satisfactory qualities for waste storage.

REFERENCES

[1] U.S. Pat. No. 4,028,265.
[2] Ind. Eng. Chem. Res., 27, 1988, pages 1291–1296.
[3] U.S. Pat. No. 4,271,130.

What is claimed is:

1. Method for conditioning a waste constituted by an aqueous solution comprising 3 to 10 mol/l of sodium hydroxide NaOH, characterised in that it comprises the following stages:

a) adding a quantity of metakaolin powder to the aqueous solution such that a suspension is obtained capable of solidifying and forming a crystalline phase of the zeolite A type;

b) introducing the suspension into a mould;

c) leaving the suspension to solidify in the mould in order to obtain a moulded solid product based on zeolite A;

d) drying the moulded product; and e) converting the zeolite A phase into a nepheline type phase by heat treatment at a temperature of 1000° C. to 1500° C.

2. Method according to claim 1, in which the quantity of metakaolin added is such that the molar ratio of metakaolin to sodium hydroxide is from 0.4 to 0.6.

3. Method according to claim 2, in which the metakaolin/sodium hydroxide molar ratio is around 0.5.

4. Method according to claim 1, in which the metakaolin powder has an average granulometry of 1 to 50 $\mu$m.

5. Method according to claim 1, in which the metakaolin is obtained by calcination of kaolin at a temperature of 500 to 1200° C.

6. Method according to claim 1, in which the quantity of metakaolin added is such that the water content of the suspension is from 30 to 70% by weight.

7. Method according to claim 1, in which the total content of $NO_3^-$ and $NO_2^-$ ions present in the aqueous solution of origin is from 0 to 0.5 mol/l.

8. Method according to claim 1, in which stage c) is carried out at a temperature of 15 to 100° C.

9. Method according to claim 1, in which the drying of the moulded product is carried out, after de-moulding said product, at a temperature of 110 to 500° C.

10. Method according to claim 1, in which the aqueous solution of origin is a radioactive solution.

* * * * *